United States Patent [19]
Clegg et al.

[11] Patent Number: 5,481,077
[45] Date of Patent: Jan. 2, 1996

[54] SHIFTER MOUNTED ACCESSORY CONTROL PANEL

[76] Inventors: Wren A. Clegg, 103 Meals Dr., Carlisle, Pa. 17013; William S. Reisinger, 2078 Spring St., York, Pa. 17404

[21] Appl. No.: 291,917

[22] Filed: Aug. 18, 1994

[51] Int. Cl.$^6$ ..................................................... H01H 9/06
[52] U.S. Cl. ................... 200/61.88; 200/61.28; 200/61.85
[58] Field of Search ............................ 200/61.28, 61.85, 200/61.88, 293–307

[56] References Cited

U.S. PATENT DOCUMENTS

| | | | |
|---|---|---|---|
| 1,699,392 | 1/1929 | Fisher | 307/10.8 |
| 1,837,634 | 12/1931 | Stackhouse et al. | 200/61.28 |
| 1,931,775 | 10/1933 | Stafak | 200/61.28 |
| 1,998,639 | 4/1935 | Roberts | 200/61.28 |
| 2,054,808 | 9/1936 | Condon | 200/61.28 |
| 4,360,718 | 11/1982 | Schobinger et al. | 200/61.88 |
| 4,421,960 | 12/1983 | Arima et al. | 200/61.54 |
| 4,508,944 | 4/1985 | Yashima et al. | 200/61.85 |
| 4,565,909 | 1/1986 | Yashima et al. | 200/61.85 |
| 4,574,651 | 3/1986 | Nordstrom | 200/61.85 X |
| 4,710,599 | 12/1987 | Motodate | 200/61.85 |
| 4,981,121 | 1/1991 | Tani | 200/61.85 X |
| 5,182,494 | 1/1993 | Segaud | 315/80 |

OTHER PUBLICATIONS

Overdrive, Feb. 1993, pp. 131, 132.

*Primary Examiner*—J. R. Scott
*Attorney, Agent, or Firm*—Aquilino & Welsh

[57] ABSTRACT

A shifter mounted accessory control panel which fits onto a shifter pole to cooperate with an existing shifter knob which includes a housing having a rear pole mounting portion and front a switch enclosing portion separated by an internal wall. The pole mounting portion including a bore adapted to be mounted coaxially with a shifter pole. The switch enclosing portion including a top wall, a bottom wall, opposed side walls and a front display face which are connected together to form a compartment. The opposed side walls having a plurality of switches in each wall and being larger at the bottom wall than at the top wall, thereby causing the front edges of the side walls to be angled outwardly from top to bottom which causes the front display face being attached to the front edges of the side walls to slope upward and inwardly toward the pole mounting portion. The sloped front display face providing a viewing surface which a driver can easily read while seated in a driving position.

17 Claims, 3 Drawing Sheets

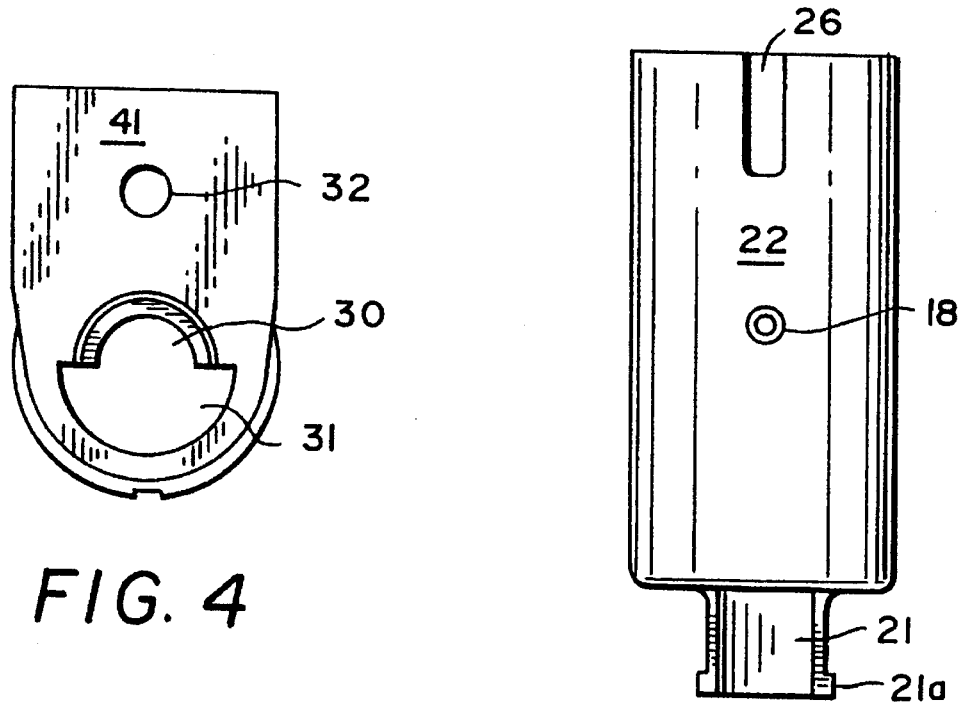
FIG. 4
FIG. 5
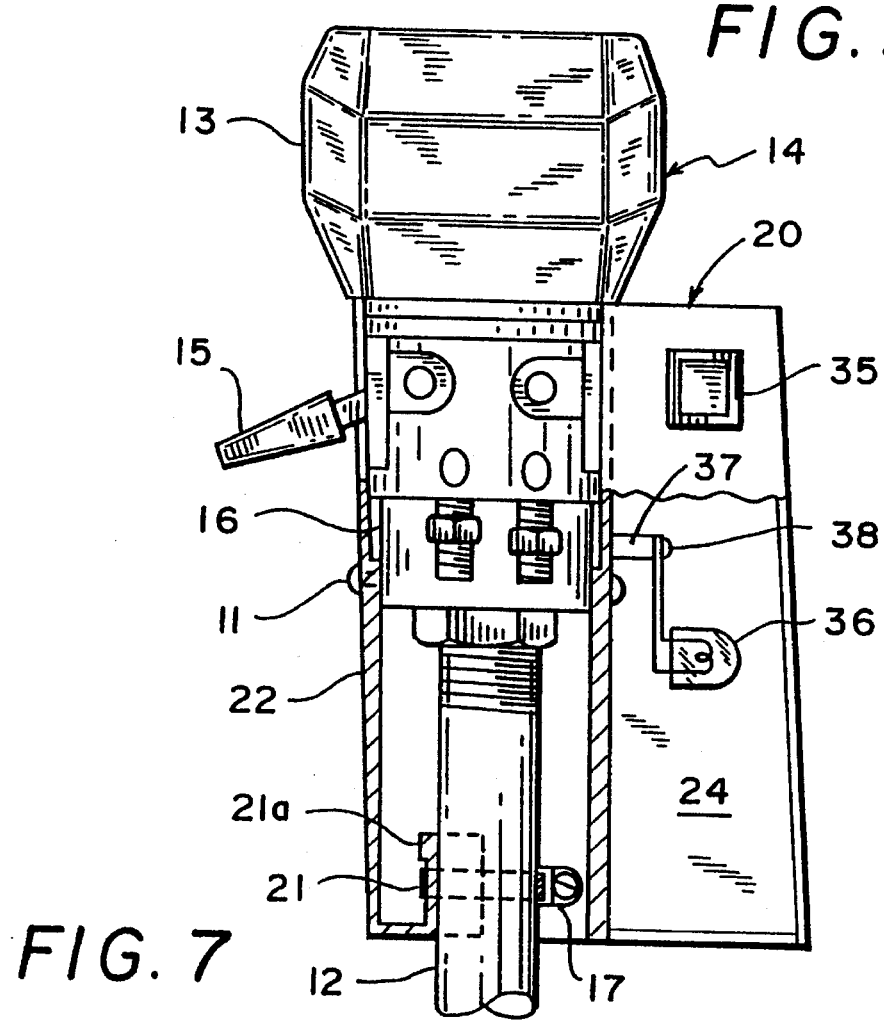
FIG. 7

SHIFTER MOUNTED ACCESSORY CONTROL PANEL

FIELD OF THE INVENTION

The present invention relates to an accessory control panel for vehicles and, more particularly, an accessory switch assembly positioned on the shifter pole of the transmission mechanism for commercial vehicles.

BACKGROUND OF THE INVENTION

There are over six million men and women nationwide who have been issued a commercial driver's license, most of whom drive many highway miles a year. During the course of their driving, they switch on and off the truck's operating lights and accessories more often than other drivers. Like most highway vehicles, the driver while seated reaches up to the dash board and chooses from a predetermined layout of switches to operate a specific accessory.

One problem with the current layout is that while driving a commercial vehicle, this reach can be considerable due to the layout and the size of the truck cabs. The reach sometimes requires more than just movement of the arms and fingers of the driver. In many instances, the driver may lean forward or sideways leaving the view of the vehicles side view mirrors. The physical movement of the driver while reaching for a specific switch often breaks the concentration that has developed, thereby increasing the possibility of an accident.

An important aspect of driving is signalling lane changes and turns, which when driving a commercial vehicle usually occurs while shifting gears. Therefore, it would be beneficial to allow a truck driver to shift gears while simultaneously switching on and off directional signals with the same operating hand.

The present invention contemplates overcoming these problems by centralizing a plurality of commonly used accessory switches on the shifter pole of a vehicle.

SUMMARY OF THE INVENTION

In accordance with the present invention, there is provided an accessory control panel adapted to be mounted on an existing transmission shifter pole in a vehicle. The panel includes a custom designed housing with a rear pole mounting portion and a front switch enclosing portion having a front face for displaying indicia corresponding to the adjacent switches. The rear portion including a bore running from top to bottom with a projection at the bottom thereof for securing the housing coaxially about a shifter pole.

The front portion including a pair of opposed side walls with a plurality of switches in each side. The front edge of the side walls being angled outwardly from top to bottom, thus the removable front face is sloped upwardly and inwardly towards the shifter knob grip to allow viewing of the indicia corresponding to the accessory switches while the driver is comfortably seated in a side mirror viewing position.

It is an object of the present invention to provide a shifter mounted accessory control panel to improve the comfort and ease in operation of motorized vehicles.

Another object of the invention is to provide a safety benefit by giving a commercial vehicle operator the ability to shift gears, signal and steer while maintaining constant eye contact with the road, pedestrians and surrounding traffic.

Still another object of the present invention is to provide energy conservation by maintaining peak engine operating performance, i.e., operating in a higher gear with lower rpm's for longer periods of time, by allowing a driver to operate a cruise control switch a few seconds earlier between each shift, thereby signalling the electronic fuel pump and computerized engine management system to operate with designed peak performance.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 4 is a bottom view of the housing shown in FIG. 2.

FIG. 5 is a rear view of the housing shown in FIG. 2.

FIG. 7 is a partial cut away side view of the present invention mounted to a conventional shifter knob.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
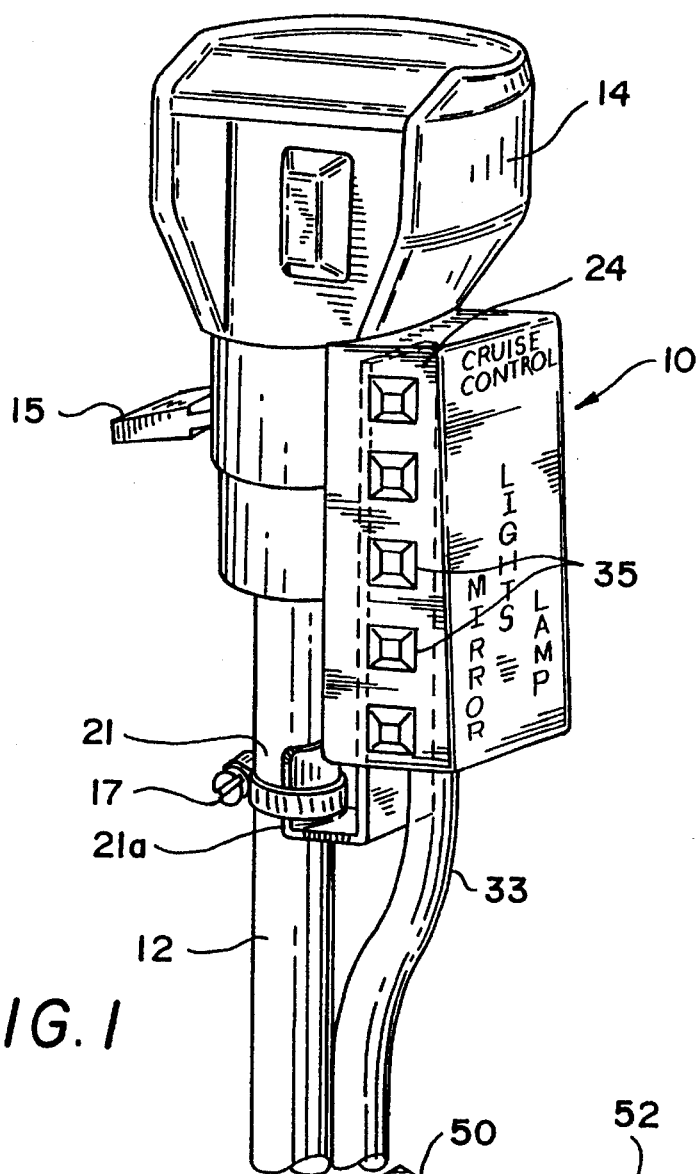
FIG. 1 is a side perspective view of the present invention mounted on a shifter pole below a conventional shifter knob.

Referring to the drawings, first particularly to FIG. 1, the shifter mounted accessory control panel 10 embodying the present invention is shown mounted to a conventional transmission shifter pole 12 by rear mounting portion 22 and cooperating with a shifter knob assembly 14. The shifter mounted accessory control panel 10 is made from a plastic and may be mold as one piece with the exception of front display face 39.

The accessory control panel 10, as shown in FIGS. 2–7 includes a housing 20 with a rear pole mounting portion 22 and a front switch enclosing portion 24 which are internally separated by a wall 40. The pole mounting portion 22 may have various outer configurations, however, its inner configuration is generally cylindrical with a top edge 25 and a bottom edge 27 having openings therein to form a cylindrical bore therethrough denoted by axis 23. The cylindrical bore may have a constant diameter or it may taper down and become smaller from top edge 25 to bottom edge 27. Thus, the pole mounting portion 22 may have an outer circumference which is larger at top edge 25 than at bottom edge 27. In use, bore 23 fits coaxially about the shifter pole 12 and houses the bottom portion 16 of shifter knob assembly 14 which includes air line inlet P and outlet E, as can be seen in FIG. 7. The air lines function in combination with air switch 15 to control the gears into which the transmission can be shifted.

Figure 3:
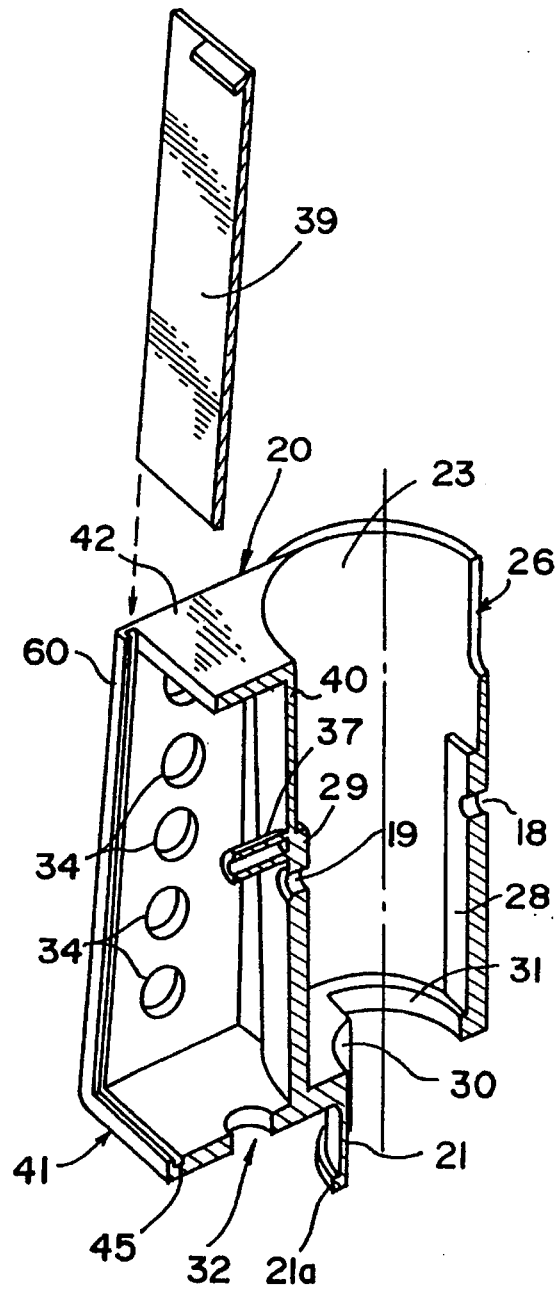
FIG. 3 is a cut away view of the housing shown in FIG. 2.

As can be seen in FIGS. 3 and 7, the inner surface of pole mounting portion 22 includes raised areas 28 and 29. These areas provide added strength to housing 20 and also function as shifter knob assembly securing areas. Areas 28 and 29 include apertures 18 and 19, respectively. The apertures provided access for screws 11 which run through the housing 20 and secure to shifter knob bottom portion 16. In addition to screws 11 the housing 20 is also attached to the shifter pole 12 by means of clamp structure 17 which cooperates with projection 21. Projection 21 is generally semi-circular having a raised rib 21a which prevents the clamp 17 from slipping off of the projection. Projection 21 may extend outward from the bottom of housing 20 as depicted in FIGS. 1–5 or it may extend inward as shown in FIG. 7.

Rear pole mounting portion 22 of housing 20 is shaped at top edge 25 to conform to the bottom of shifter grip 13 and bore 23 is dimensioned to enclosed shifter knob bottom portion 16. Slot 26 extending down from top edge 25 of pole mounting portion 22 accommodates an air switch 15, thereby the housing does not interfere with shifter knob assembly 14. At bottom edge 27 of pole mounting portion 22 of housing 20 there is shown two different size semi-circular openings 30 and 31. The smaller semi-circular opening 30 has a radius approximately the same size as the radius of shifter pole 12 and is subtended by projection 21. Whereas, the larger semi-circular opening 31 is dimensioned to allow two or more air lines to pass therethrough in order to connect to inlet P and outlet E is shown in FIG. 7.

Switch enclosing portion 24 includes opposed side walls 65 with front edges 60 which extend further from the pole mounting portion 22 at bottom edge 27 than at top edge 25, thus the front edges are angled outwardly from top to bottom. The angled side walls 65 cause the front display face 39 to be sloped upwardly and inwardly which is extremely important as it allows the indicia on front face 39 to be read while a driver is comfortable seated. The sloping front face 39 also prevents shifter grip 13 from interfering with the driver's viewing of the displayed indicia.

Front display face 39 slides into housing 20 via a recessed track 45 in the side walls 65 and bottom wall 41 of the switch enclosing portion 24. The front face 39 is removable in order to provided access to the compartment 61 formed by the switch enclosing portion 24 of the housing 20, see FIG. 2. At the top and bottom of switch enclosing portion 24 are formed upper wall 42 and lower wall 41 which in combination with the side walls 65, removable front face 39 and internal separating wall 40 form compartment 61 for enclosing the rear of switches 35, a light 36 and wiring for the switches and light.

A light 36 is secured and positioned within compartment 61 by screw 38 which attaches to post 37 extending from internal wall 40. The light 36 is insulated or spaced from the wires in harness 33 so as to prevent damage to the wires. Light 36 functions to backlight the transparent indicia on front face 39. The indicia can be varied depending upon which accessories are to be controlled by the adjacent switches 35.

Each side wall 65 includes a plurality of openings 34 into which switches 35 are inserted. In the preferred embodiments there are five openings in each side wall 65, thereby allowing up to ten switches to be connected to various accessories. The number of switch openings 34 could be more or less depending on the number of accessories desired to be controlled. Openings 34 may be circular or square depending on the type of switches that are to be mounted therein. Each switch 35 is connected to wires extending from multiple conductor wire harness 33 in order to control a specific accessory such as cruise control, left or right turn signals, heated mirrors, overhead lamps, etc. Lower wall 41 includes a circular opening 32 which is provided for entry of wire harness 33 into compartment 61.

Figure 6:
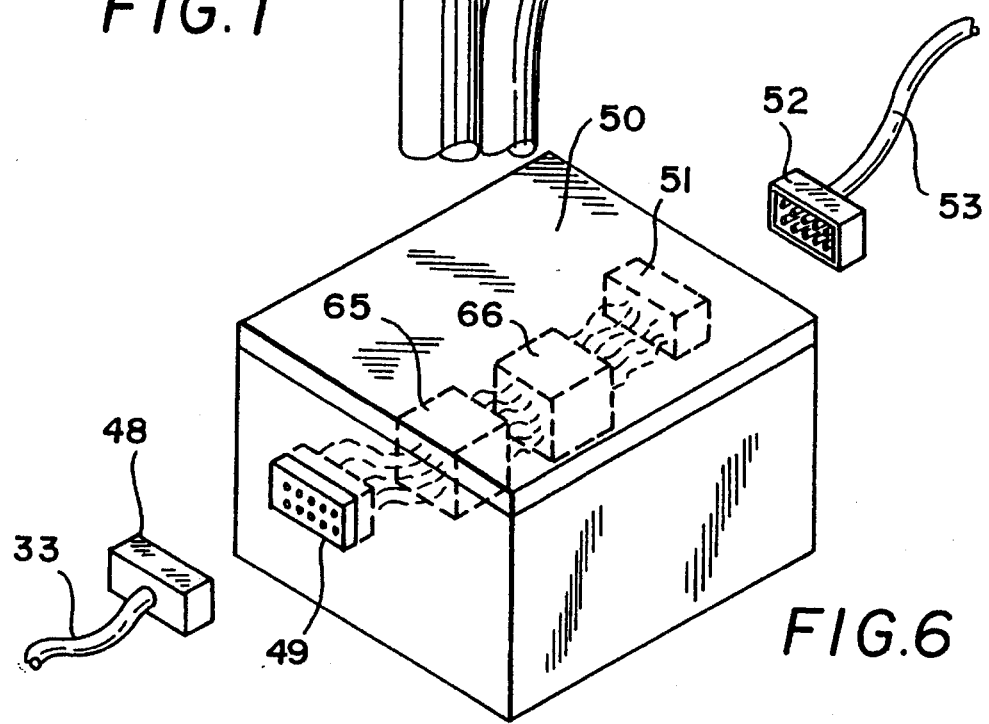
FIG. 6 is a view of the relay box used with the present invention.
Figure 2:
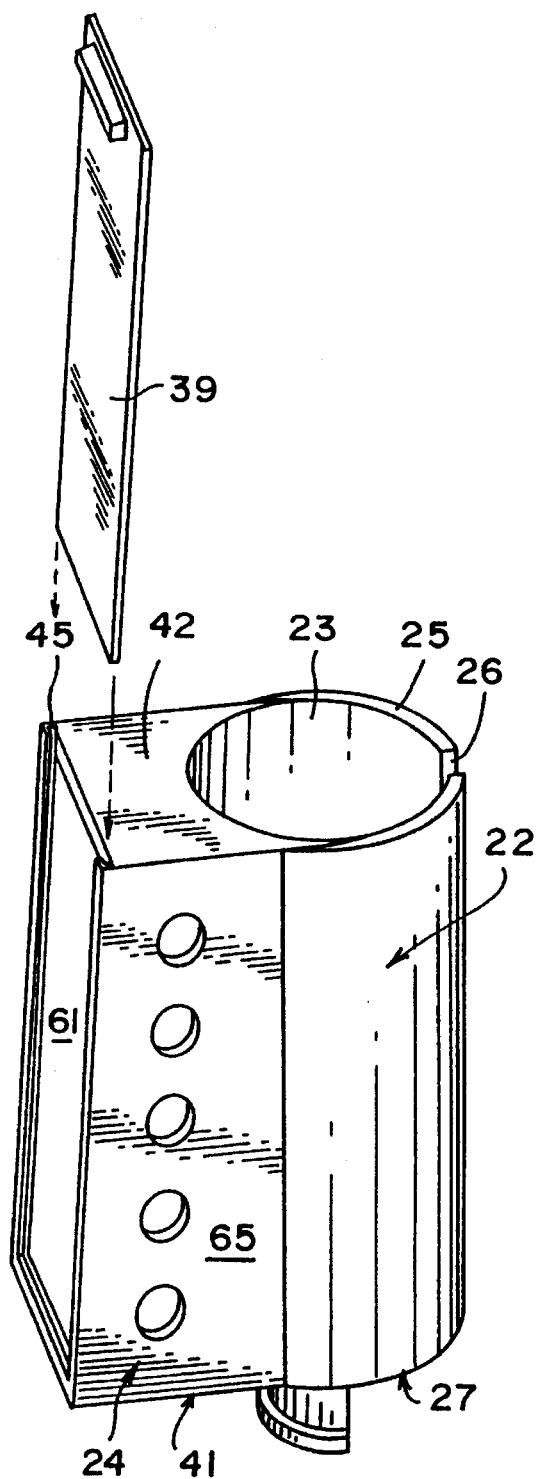
FIG. 2 is a side perspective view of just the housing of the present invention showing the removable front face.

FIG. 6 displays a relay box 50 which functions to connect switches 35 of the shifter mounted accessory control panel 10 to the appropriate accessory. The wires from harness 33, which are preferably 18 gauge, exit the housing 20 through opening 32, run down along shifter pole 12 in harness 33, preferably exit the truck cab through a shifter boot on the cab floor and then travel forward and up the cab firewall before re-entering the cab under the dashboard. The wires in harness 33 are then connected to relay box 50 by appropriate electrical connectors 48 and 49 which connect the relays 66 to the switches. Exiting the relays is wiring corresponding to the accessory to be controlled which in turn is connected to a wire harness 53 by electrical connectors 51 and 52. The wires in harness 53 are of a gauge that is heavier than that of harness 33, such as 12 or 14 gauge. Thus, the diameter of the exiting wires is larger than the diameter of the entering wires. Each of the heavier gauge exiting wires are then connected to the existing accessory wiring so as to electrically parallel the dash mount control switch wiring with the shifter mounted accessory control switch wiring. The use of lighter gauge wires in harness 33 and relay box 50 allows the diameter of the harness to be small and aesthetically pleasing.

In operation, a driver comfortable sitting in a vehicle would now have the option of using shifter mounted switches or dash mounted switches to turn on and off the most frequently used accessories. When using the shifter mounted switches the driver merely engages the switch which sends a signal to a relay which in turn sends a signal to an accessory wired thereto. If the shifter mounted control panel should become inoperable the driver could always resort to the dash mounted switches.

To install the present invention shifter knob assembly 14 is disconnected from shifter pole 12 and air lines and the existing cylindrical housing surrounding the lower portion 16 of shifter knob assembly 14 is removed. Then housing 20 with all the switches and wiring installed therein is placed over shifter pole such that rear pole mounting portion 22 is coaxial with the pole, while the air lines are fed through opening 31 and reconnected to shifter knob assembly 14. Shifter knob bottom 16 is reconnected to shifter pole 12 and then housing 20 is slid up to abut the bottom of grip 13 while mating slot 26 to air switch 15. Housing 20 is then secured via screws 11 to the shifter knob assembly 14 and to the shifter pole 12 via clamp structure 17 about projection 21. After screws 11 are in place front display face 39 connected to the housing 20 and the wire from the switches 35 is fed to the appropriate relay which in turn is wired to the respective accessory to be controlled.

While various preferred embodiments have been shown and described, it will be understood that there is no intent to limit the invention by such disclosure, but rather, is intended to cover all modifications and alternate constructions falling within the spirit and scope of the invention as defined in the appended claims.

We claim:

1. A shifter mounted accessory control panel which fits onto a shifter pole to cooperate with an existing shifter knob comprising:

a housing with a bore running from top to bottom to accommodate the pole of a shifter;

a first set of switches for controlling vehicle accessories mounted on a first side of said housing;

a second set of switches for controlling vehicle accessories mounted on a second side of said housing opposite said first side; and a front display face attached to and between the front edges of said opposite sides so as to be sloped inwardly from bottom to top toward said bore for displaying indicia corresponding to said switches to a seated driver.

2. The invention of claim 1 wherein said housing includes a pole mounting portion and a switch enclosing portion;

the pole mounting portion including said bore;

the switch enclosing portion including a top wall and a bottom wall which are connected to said first and second side of said housing and to said front display face to form a compartment;

said first and second sides being larger at the bottom wall than at the top wall, thereby causing the front edges of the sides to be angled outwardly from top to bottom which causes the front display face being attached to the front edges of said opposite sides to slope upward and inwardly toward the pole mounting portion.

3. The invention of claim 2, wherein said pole mounting portion and said switch enclosing portion are separated by an internal wall.

4. The invention of claim 1 further including a light in the housing for backlighting the front display face.

5. The invention of claim 1 wherein said front display face is in the form of a slidable cover which engages a recessed track in said housing.

6. The invention of claim 1 wherein said housing further includes a generally semi-circular projection with a raised rim adjacent the bottom of said housing.

7. The invention of claim 6 further including a clamp which cooperates with said projection for securing said housing to a shifter pole.

8. The invention of claim 1 wherein said switches are wired into a relay box by a first gauge wire and out of said relay box to a specific accessory by a wire of heavier gauge than said first gauge.

9. The invention of claim 1 wherein said housing includes an opening in the bottom thereof for entry of multiple conductors.

10. The invention of claim 1 wherein the top surface of said housing includes a slot between said first and second sides extending downward to accommodate an air switch.

11. A shifter mounted accessory control panel which fits onto a shifter pole to cooperate with an existing shifter knob comprising:

a housing having a pole mounting portion and a switch enclosing portion;

the pole mounting portion including a a clamp for securing the housing to a shifter pole;

the switch enclosing portion including a top wall, a bottom wall, opposed side walls and a front display face which are connected together to form a compartment;

a plurality of vehicle accessory switches extending from said housing and the front display face being attached to the front edges of the side walls, thereby sloping upward and inwardly toward the top wall.

12. The invention of claim 11 further including a light in the compartment for backlighting the front display face.

13. The invention of claim 11 wherein said front display face is in the form of a slidable cover which engages a recessed track in said switch enclosing portion of said housing.

14. The invention of claim 11 wherein said switches are wired into a relay box by a first gauge wire and out of said relay box to a specific accessory by a wire of heavier gauge than said first gauge.

15. The invention of claim 11 wherein said switch enclosing portion of said housing includes an opening in the bottom wall thereof for entry of multiple conductors.

16. The invention of claim 11 wherein the top surface of said pole mounting portion of said housing includes a slot between said first and second sides extending downward to accommodate an air switch.

17. A shifter mounted accessory control panel which fits onto a shifter pole to cooperate with an existing shifter knob comprising:

a housing having a pole mounting portion and a switch enclosing portion;

the pole mounting portion including a clamp for securing the housing to a shifter pole;

the switch enclosing portion including a top wall, a bottom wall, opposed side walls and a front display face which are connected together to form a compartment; and a plurality of vehicle accessory switches extending from opposed side walls of said housing.

\* \* \* \* \*